United States Patent
Mori (10) Patent No.: US 6,751,535 B2
(45) Date of Patent: Jun. 15, 2004

(54) TRAVEL CONTROLLING APPARATUS OF UNMANNED VEHICLE

(75) Inventor: Masaki Mori, Kawasaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/050,824

(22) Filed: Jan. 18, 2002

(65) Prior Publication Data

US 2002/0099481 A1 Jul. 25, 2002

(30) Foreign Application Priority Data

Jan. 22, 2001 (JP) ........................................ 2001-012722

(51) Int. Cl.[7] .............................................. G01C 21/26
(52) U.S. Cl. ........................ 701/23; 701/213; 318/587; 340/437
(58) Field of Search .............................. 701/23, 24, 25, 701/26, 41, 96, 300, 301, 213, 217, 216; 340/988, 995.28, 435, 436, 437, 903; 318/587; 180/169

(56) References Cited

U.S. PATENT DOCUMENTS

| | | | | |
|---|---|---|---|---|
| 4,939,650 A | * | 7/1990 | Nishikawa | .................. 701/26 |
| 5,208,750 A | * | 5/1993 | Kurami et al. | ................. 701/28 |
| 5,422,639 A | * | 6/1995 | Kobayashi et al. | ......... 340/988 |
| 5,875,408 A | * | 2/1999 | Bendett et al. | ................. 701/23 |
| 6,064,926 A | * | 5/2000 | Sarangapani et al. | ......... 701/26 |
| 6,151,539 A | * | 11/2000 | Bergholz et al. | ............... 701/25 |
| 6,253,128 B1 | * | 6/2001 | Kageyama et al. | ........... 701/23 |
| 6,349,249 B1 | * | 2/2002 | Cunningham | ................. 701/28 |
| 6,445,983 B1 | * | 9/2002 | Dickson et al. | ............... 701/23 |

* cited by examiner

Primary Examiner—Tan Q. Nguyen
(74) Attorney, Agent, or Firm—Varndell & Varndell, PLLC

(57) ABSTRACT

A travel controlling apparatus of an unmanned vehicle provided with a GPS receiver (13) receiving a GPS signal so as to position a position of a vehicle, an autonomous navigation computing device (14) positioning a position and an azimuth of the vehicle on the basis of a traveling direction and distance of the vehicle, a position measuring portion (11) calculating a present position and azimuth, and a travel controlling portion (17) controlling the vehicle travel. The travel controlling apparatus is provided with a roadside zone distance measuring device (15) for measuring a distance from the vehicle to a roadside zone (5) provided in a side of the traveling path (4), and the present position and azimuth is determined on the basis of the roadside zone distance measured by the roadside zone distance measuring device (15).

4 Claims, 7 Drawing Sheets

TRAVEL CONTROLLING APPARATUS OF UNMANNED VEHICLE

BACKGROUND OF THE INVENTION

1. Field of the Invention

The present invention relates to a travel controlling apparatus of an unmanned vehicle which automatically travels on a preset traveling path in a mine, a stone quarry and the like.

2. Description of the Prior Art

Conventionally, as a traveling system of an unmanned vehicle automatically traveling on a preset traveling path, there has been well known a structure which employs both of a global positioning system navigation (hereinafter, refer to a GPS navigation) controlling an absolute position of the unmanned vehicle on the basis of a GPS receiver and an autonomous navigation detecting a traveling direction and a traveling distance of the unmanned vehicle so as to estimate and calculate a relative position and an azimuth on the basis of the absolute position by an inner angle sensor, thereby improving an accuracy of position measurement in accordance with a mutual complement between the both and traveling.

As the autonomous navigation, there have been known a dead reckoning navigation (a navigation of calculating a traveling distance by using a speed sensor and a moving distance sensor and estimating an azimuth by using a gyroscope and an earth magnetism sensor, thereby estimating the position and the azimuth of the vehicle), an inertial navigation (a navigation of estimating the position and the azimuth of the vehicle by using the gyroscope and an acceleration), and the like. Hereinafter, these navigation methods are totally called as an autonomy navigation.

Figure 12:
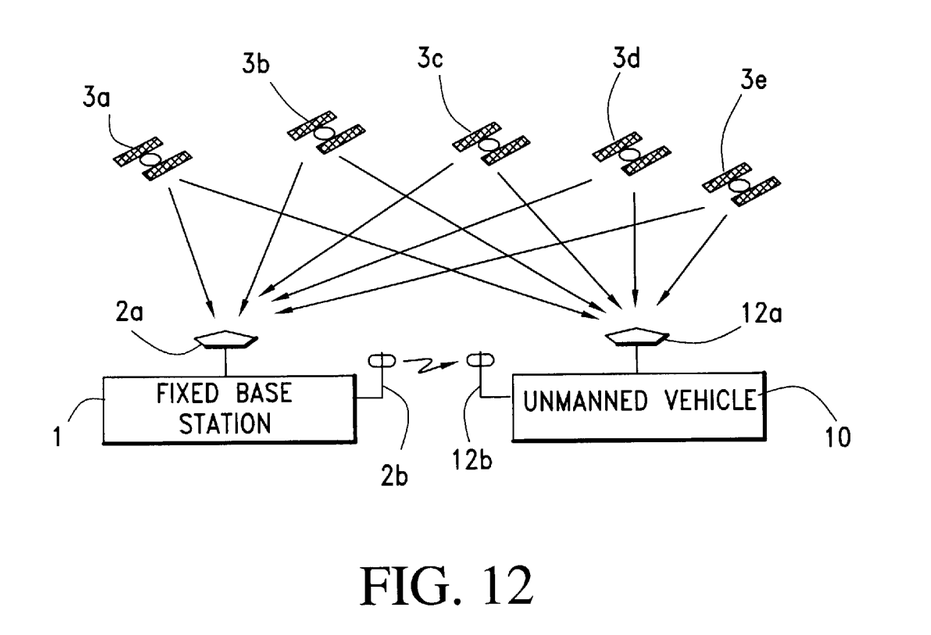
FIG. 12 is a schematic view of a traveling system of an unmanned vehicle.

FIG. 12 is a view describing a traveling system of an unmanned vehicle. In FIG. 12, a fixed base station 1 governs a control of an unmanned vehicle 10, and is structured such as to transmit a traveling path data and a vehicle control govern command to the unmanned vehicle 10 via a control communication antenna 2b and receive a vehicle state signs Further, the unmanned vehicle 10 has a position measuring portion and a travel controlling portion The position measuring portion calculates an absolute coordinate value of a present position of the vehicle itself on the basis of positional information received from a plurality of satellites 3a to 3e by the GPS receiver via the GPS antenna 12a (the GPS navigation). At this time, the position measuring portion calculates a relative position and an azimuth from the absolute coordinate position given by the GPS on the basis of the traveling direction and the traveling distance, and subsequently estimates and calculates the present position and the azimuth (the autonomy navigation). Further, after traveling for a predetermined GPS positioning sampling time, the present position and the azimuth given by the relative position and the azimuth are corrected on the basis of the absolute position newly measured by the GPS. Further, the travel controlling portion calculates a traveling direction on the basis of a result of comparison between the position and the azimuth (the traveling direction) of the preset traveling path, and the present position and azimuth, and controls a steering and a vehicle speed so as to travel at a predetermined speed in the traveling direction. The structure is made such as to guide and travel the unmanned vehicle by repeating the processes mentioned above.

The GPS navigation mentioned above has a disadvantage that a calculating time from a timing starting the positioning and a timing time interval outputting a communication time lag and the positioning data from the GPS receiver to a final position measuring portion are slower than the position calculating time in accordance with the autonomy navigation. Further, there has been known a problem that an accuracy of positioning is deteriorated and there is a case that the positioning can not be executed due to a receiving environment of the satellites 3a to 3e, that is, a receiving environment reason such as a midair viewing property whether or not a midair of the unmanned vehicle is in a state of capable of normally receiving the GPS due to a peripheral quay wall, a forest, a structure or the like, an arrangement of satellites, a multipass at a time of receiving a radio wave reflected from a peripheral reflection subject, and the like, and in the case of DGPS (so-called differential type GPS), for the reason that a compensated information communication from the fixed base station 1 delays due to various reasons such as a mountain, the quay wall, the forest, the structure, the radio wave environment and the like.

On the contrary, the autonomy navigation is employed for compensating the disadvantage, and since the relative position is calculated by calculating a traveling distance for a short time at every predetermined time, for example, on the basis of measured values of the speed sensor and the azimuth sensor, it is possible to position at real time. However, since sensor errors of the speed sensor, the azimuth sensor and the like are accumulated, whereby there is a problem that the accuracy of positioning is deteriorated, it is intended to maintain an accuracy of position by compensating at every predetermined time on the basis of the GPS navigation mentioned above.

However, in the traveling system of the unmanned vehicle in accordance with the conventional art, there is the following problems.

(1) In the GPS navigation, there is a case that the accuracy of positioning is deteriorated due to an aggravation of the satellite receiving environment or an aggravation of the environment for receiving the compensated data from the base station in the case of DGPS, or the positioning can not be executed. In this case, an accuracy of a present position and a present azimuth which are calculated on the basis of the absolute position in accordance with the GPS navigation and the relative position and azimuth in accordance with the autonomous navigation is deteriorated, or when traveling only in accordance with the autonomous navigation, the accuracy of the present position and the present azimuth is deteriorated due to an accumulation of the measured errors. Accordingly, since an agency of guiding the unwanted vehicle is reduced, the vehicle control is damaged.

(2) In the case that the speed sensor, the azimuth sensor and the like in connection to the autonomous navigation are out of order, when traveling only in accordance with the GPS navigation, the positioning data output time interval in accordance with the GPS navigation is slow as mentioned above, the interval between the measured absolute coordinate position is too long, and an accuracy of travel guiding is reduced. Further, the accuracy of travel guiding is reduced due to the matter that the accuracy of speed and the accuracy of azimuth are deteriorated at a time of a low speed in the case of only the GPS navigation, the matter that the accuracy of positioning position and azimuth) is deteriorated for the reason that the GPS antenna track (corresponding to the azimuth in accordance with the GPS) is different from a direction of attitude of the vehicle at a time of turning, and the like.

Further, when the accuracy of positioning (position and azimuth) is reduced due to the deterioration of the receiving environment and the communication environment of the GPS navigation at this time, the accuracy of travel guiding is further reduced. Accordingly, in the case of the trouble in which the autonomous navigation can not be executed, the vehicle control is damaged, and a working ratio of the unmanned vehicle is reduced.

However, there is strongly desired a traveling system having a high reliability in which it is possible to securely guide and travel even in the case mentioned above.

SUMMARY OF THE INVENTION

The present invention is made by paying attention to the problems mentioned above, and an object of the present invention is to provide a travel controlling apparatus of an unmanned vehicle which can maintain a high accuracy of travel guiding even in the case that an accuracy of positioning of a GPS navigation or an autonomous navigation is deteriorated and a state that a positioning can not be executed is invited.

In order to achieve the object mentioned above, in accordance with a first aspect of the present invention, there is provided a travel controlling apparatus of an unmanned vehicle comprising:

a GPS receiver receiving a GPS signal so as to position an absolute coordinate position of a vehicle;

an autonomous navigation computing device measuring a traveling direction and a traveling distance of the vehicle so as to position a relative coordinate position and azimuth from a specific position of the vehicle on the basis of the measured result;

a position measuring portion calculating a present position and azimuth of the vehicle on the basis of the respective measured results of the GPS receiver and the autonomous navigation computing device; and a travel controlling portion relatively comparing a position and an azimuth of a previously set traveling path with the present position and azimuth calculated by the position measuring portion so as to control the vehicle travel in such a manner as to make respective deviation values small, wherein the travel controlling apparatus is provided with a roadside zone distance measuring device for measuring a distance from the vehicle to a roadside zone provided in a side of the traveling path, and the position measuring portion compensates at least one of a position positioned by the GPS receiver and/or a position and an azimuth positioned by the autonomous navigation computing device on the basis of the roadside zone distance measured by the roadside zone distance measuring device so as to determine the present position and azimuth.

In accordance with the first aspect of the present invention, since the present position and azimuth are calculated by compensating at least any one of the position measured by the GPS navigation and/or the position and the azimuth positioned by the autonomous navigation, on the basis of the measured value of the distance to the roadside zone (constituted by a shoulder of a road, an advertising display, a reflecting plate and the like), it is possible to reduce an error of the GPS positioning and a reduction of an accuracy of measurement of the position and the azimuth in accordance with the positioning error of the autonomous navigation, and it is possible to position the position and the azimuth of the vehicle with a higher accuracy. Further, even in the case that the positioning can not be executed in accordance with the GPS navigation or the autonomous navigation, or an abnormality of the positioning data is recognized, it is possible to determine the present position and azimuth having a reliability on the basis of the positioning data (the position and the azimuth) obtained by a normal one among the GPS navigation and the autonomous navigation, and the measured value of the roadside zone distance, so that it is possible to continue the guiding travel and it is possible to increase the working ratio of the unmanned vehicle. As a result, it is possible to structure the traveling system of the unmanned vehicle having a high reliability.

In accordance with a second aspect of the present invention, the structure is made such that on the basis of the first aspect, the position measuring portion judges a stability of the roadside zone from the measured value of the roadside zone distance, and compensates on the basis of the roadside zone distance at a time when the stability is normal In accordance with the second aspect, it is judged that some abnormality is generated in an area in which the roadside zone is unstable, that is, the roadside zone discontinuously abuts against an area which is not previously set or the roadside zone largely changes in comparison with a preset rate of change, and the roadside zone distance measured in the area having the abnormality mentioned above is deemed to be an abnormal data. In this case, as a terrain intelligence of the roadside zone, there are previously set a rate of change of the roadside zone distance with respect to the shoulder placing range and the traveling road, the placing coordinates and the shape of the advertising display and the reflecting plate, and the like. Accordingly, the structure is made such as to execute the compensation on the basis of the roadside zone distance when the roadside zone is stable. Therefore, in the case that the roadside zone is unstable, it is possible to prevent the positioning (position and azimuth) accuracy from being reduced, by the compensation, it is possible to continue the automatic traveling and it is possible to increase the working ratio of the unmanned vehicle.

In accordance with a third aspect of the present invention, the structure is made such that on the basis of the first or second aspect, the compensation of the position measuring portion on the basis of the roadside zone distance is executed by a sensor fusion in correspondence to a positioning accuracy estimating value of the GPS receiver and/or a positioning accuracy estimating value of the autonomous computing device, and a positioning accuracy estimating value of the roadside zone distance measuring device.

In accordance with the third aspect, since the compensation position and the compensation azimuth are calculated by the sensor fusion in correspondence to the respective positioning accuracy estimating values of the GPS receiver, the autonomous navigation computing device and the roadside zone distance measuring device, it is possible to determine the position having the higher reliability. In this case, the positioning accuracy estimating values are estimated on the basis of the respective positioning results of the GPS receiver, the autonomous navigation computing device and the roadside zone distance measuring device, the information of the respective re d sensors, and an experimental judgement, may be estimated in real time or may be previously set to a predetermined value/

DESCRIPTION OF THE PREFERRED EMBODIMENT

A description will be in detail given below of an embodiment in accordance with the present invention with reference to the accompanying drawings.

A basic structure of a traveling system of an unmanned vehicle in accordance with the present invention is the same as that in FIG. 12. In this case, a position (an absolute coordinate) of a fixed base station 1 is previously measured accurately. The fixed base station 1 calculates an absolute coordinate value obtained by a GPS on the basis of a positional information received from a plurality of satellites 3a to 3e by a GPS receiver via a GPS antenna 2a, and compares the calculated absolute coordinate value with a base station coordinate value previously measured accurately and stored so as to determine a positioning error parameter (corresponding to a parameter showing a common error of the respective receivers, and constituted, for example, by a time lag data of a receiver built-in dock at a time of receiving a distance information from a plurality of satellites 3a to 3e, a time information data, a satellite track error data and the like) in accordance with the GPS at a time of calculation Further, the determined GPS positioning error parameter is transmitted to an unmanned vehicle 10 via a control communication antenna 2b as a compensation data.

Figure 1:
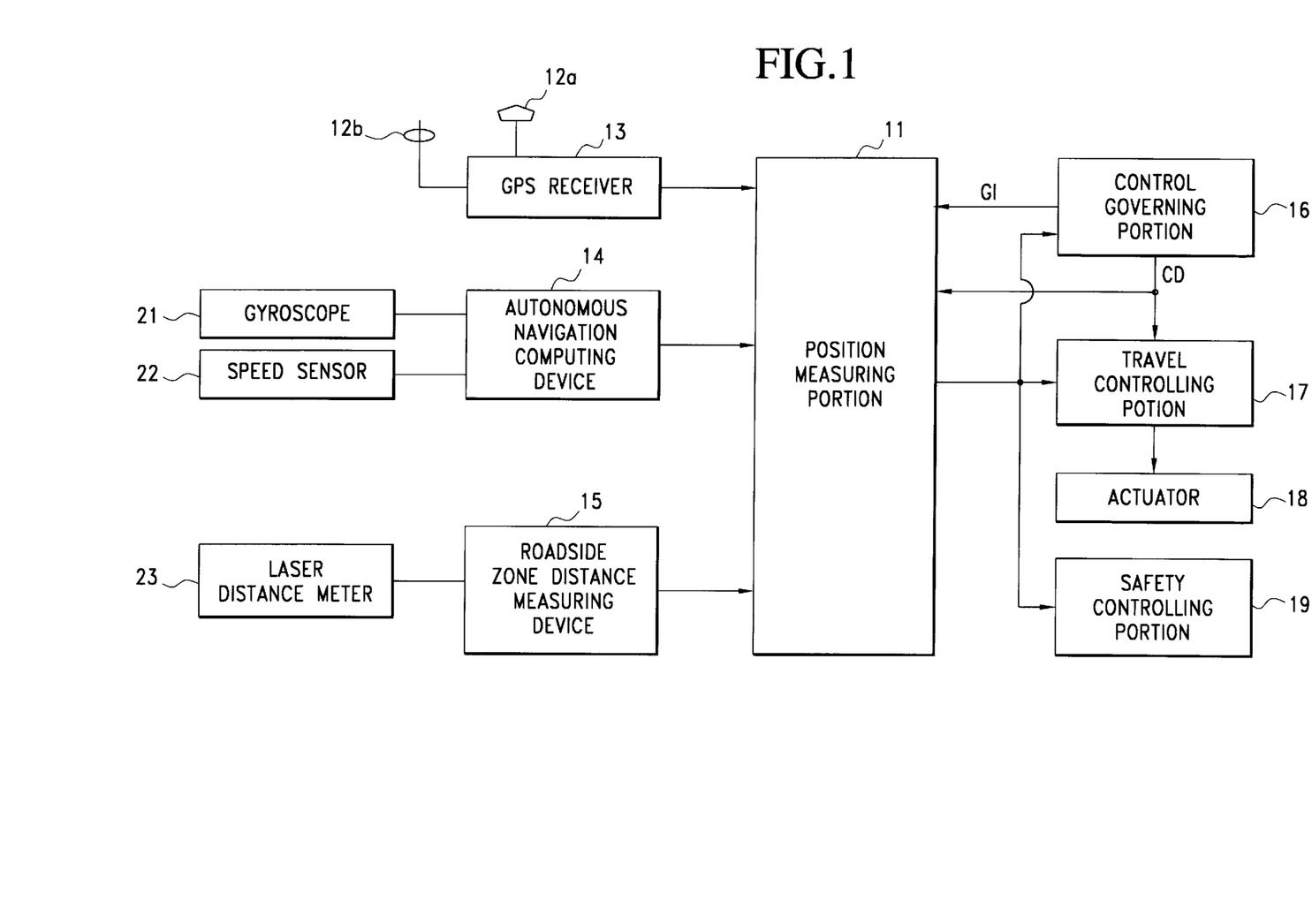
FIG. 1 is a schematic view of a control apparatus of an unmanned vehicle in accordance with the present invention.

A description will be given of a structure of a control apparatus in a side of the unmanned vehicle in accordance with the present invention with reference to FIG. 1.

The GPS receiver 13 receives the positional information from a plurality of GPS satellites via the GPS antenna 12a so as to measure the absolute position, the azimuth and the speed of the vehicle (in this case, a GPS attitude angle showing a moving direction of the GPS antenna 12a and a GPS speed showing a moving speed). At this time, the absolute coordinate value, azimuth and speed measured by the vehicle itself are corrected on the basis of the data received from the fixed base station 1 via the control communication antenna 12b (this is a so-called differential type GPS). Further, the GPS receiver 13 has its own failure diagnosis function, for example, analyzes a communication abnormality signal contained in the GPS communication information, that is, detected by the GPS satellites, and detects an abnormality of the data received in a side of the GPS receiver 13.

An autonomous navigation computing device 14 positions a relative moving position from a position corresponding to a base point, and calculates a relative position and azimuth (a traveling direction in this case) in accordance with the autonomous navigation In the present embodiment, the structure is shown by an embodiment in accordance with a dead reckoning navigation, has a gyroscope 21 for measuring the traveling direction of the unmanned vehicle and a speed sensor 22 for measuring the traveling speed, and determines a relative position and azimuth on the basis of the measured traveling direction and a traveling distance calculated from the traveling speed. In the case of the structure in accordance with an inertial navigation, in the same manner as the general structure, a platform formed by the gyroscope always keeping an equilibrium condition with respect to a gravitational direction is provided, an acceleration sensor is provided in this platform, and the structure is made such as to determine a speed signal by integrating an acceleration signal, determine a moving distance by calculating a speed signal, detect a traveling direction by the gyroscope, and determine the same relative position and azimuth as those in accordance with the dead reckoning navigation from these respective data. The following description will be given of the dead reckoning navigation, however, the same structure can be applied to the inertial navigation. In this case, the speed sensor 22 is constituted, for example, by a rotary sensor for detecting a rotational number of a tire wheel, and is provided in at least one of four tire wheels (for example, three portions comprising right and left front tire wheels and a rear wheel). Further, the autonomous navigation computing device 14 has its own failure diagnosis function, and executes a failure diagnosis on the basis of an analysis of an input data abnormality and a failure signal from the gyroscope 21, an input data abnormality from the speed sensor 22 (for example, a change abnormality of a detected signal, and a comparison between signals from the respective speed sensors 22 in the case that the speed sensors 22 are respectively provided in the right and left front tire wheels and on rear tire wheel), an analysis of a detection of wire breaking and the like.

A roadside zone distance measuring device 15 is structured such as to measure a distance from the unmanned vehicle 10 to a roadside zone (a bank, or a wall, a reflecting plate and the like showing a roadside zone) in a non-contact manner, and has, for example, a laser distance meter 23, an ultrasonic distance meter or the like. The roadside zone distance measuring device 15 has its own failure diagnosis function, and executes, for example, an analysis of a change abnormality of the measured signal.

A position measuring portion 11 averages with taking a weight corresponding to a reliability of each of the positioned data into consideration, on the basis of the positioned data (the position and the azimuth, hereinafter, the same matters are employed as far as the other matters are particularly referred) of respective positioning modulus (that is, the GPS receiver 13, the autonomous navigation computing device 14 and the roadside zone distance measuring device 15) so as to calculate the accurate position and the accurate azimuth having a higher reliability. Hereinafter, positioning in accordance with the averaging with taking the weight mentioned above into consideration is called as a sensor fusion That is, the structure is made such as to position on the basis of the sensor fusion in correspondence to a reliability of the respective positioning data, that is, a magnitude of a positioning accuracy estimated value (hereinafter, simply refer to as a positioning accuracy) in the case that no abnormality exists on the basis of the failure diagnosis result signals from the respective positioning modules 13, 14 and 15 or by checking a divergence (a data contradiction or a data abnormality) between the positioning data of the respective positioning modules 13, 14 and 15, and remove the positioning data of the abnormal module and compensate the other positioning data by the sensor fusion corresponding to the positioning accuracy (reliability) in the case that an abnormality exists in any positioning module, thereby more accurately determining the position and the azimuth of the unmanned vehicle. In this case, the positioning accuracy of the respective positioning modules 13, 14 and 15 can be estimated from the positioning result, the recognize respective sensor information and the experimental judgement, and the estimated value may be estimated and calculated in real time at a time of actual process, or may be previously set to a predetermined value.

In this case, as a method of detecting the data abnormality mentioned above, for example, there is a method of inputting a terrain intelligence along the traveling path from a control governing portion 16 so as to judge a data abnormality on the basis of a difference value information between the input terrain intelligence and the positioning data from the roadside zone distance measuring device 15.

Further, in order to travel the unmanned vehicle on the basis of the determined accurate positioning data, the positioning data is output to the control governing portion 16, a travel controlling portion 17 and a safety controlling portion 19, respectively.

The control governing portion 16 previously stores a traveling path data CD and a terrain intelligence GI and outputs the stored traveling path data CD to the travel controlling portion 17 and the position measuring portion 11 and outputs the terrain intelligence GI to the position measuring portion 11 at a time of automatic traveling. The terrain intelligence GI corresponds to an information relating to the roadside zone placed along the traveling path and details thereof will be described later.

In this case, the traveling path data CD may be prepared in accordance with a teaching obtained by actually traveling the vehicle manually so as to teach, or may be structured such as to receive the data previously prepared in off line on the basis of a measuring data of the traveling path from the field base station 1 via the control communication antenna 12b. Further, it may be obtained by editing and correcting the traveling path data CD prepared in accordance with the teaching mentioned above in correspondence to the distance with respect to the roadside zone, that is, in connection with the roadside zone distance.

Further, the teaching is executed at a time when the condition of the GPS is good, and stores respective data of the position, the azimuth (the traveling direction) and the vehicle speed applied by the GPS at a time of actually traveling along the traveling path at every predetermined time. At this time, as the position and azimuth data, it is preferable to employ a position and an azimuth obtained by estimating the position and the azimuth given by the GPS and the position and the azimuth given by the autonomous navigation on the basis of the sensor fusion, in correspondence to a reliability of the respective positioning data, that is, in accordance with a magnitude of an intermittence time of the GPS communication signal and the GPS positioning error, and the measuring error of the autonomous navigation and the like.

The travel controlling portion 17 controls various kinds of actuators 18 for controlling a steering and a speed so that the unmanned vehicle travels in accordance with the traveling path data. In this case, the actuators 18 includes, for example, a steering control valve for controlling a steering cylinder executing a steering operation, a brake control valve for controlling a brake and a retarder, a motor for controlling an angle of oscillation of a rotational number controlling lever of an engine, and the like. The travel controlling portion 17 calculates the traveling direction and the traveling distance so that respective deviations between a target position and a target azimuth on the traveling path and the present position and the present azimuth input from the position measuring portion 11 become small, outputs respective control commands to the actuators 18 on the basis of the calculated traveling direction and traveling distance, and controls an automatic traveling of the unmanned vehicle.

A safe controlling portion 19 has a function of detecting an obstacle (an inroad of a passenger and a vehicle, a rock fall and the like) on a traveling course in front of the unmanned vehicle on the basis of the present positional data output from the position measuring portion 11, and safely stops the unmanned vehicle or travels the unmanned vehicle with bypassing the obstacle in the case of detecting the obstacle. Further, some unexpected abnormality (that is, abnormality beyond its own detection) is applied to the position measuring system or the controlling system, it detects the roadside band, the car coming from the opposite direction and the like which are not expected to exist on the course, as the obstacle, thereby urgently stopping the vehicle.

Next, a description will be given of the terrain intelligence mentioned above in detail In order to estimate the present position of the unmanned vehicle on the basis of the distance between the roadside zone measured by the roadside zone distance measuring device 15 and the traveling unmanned vehicle and execute the sensor fusion between the estimated positional data and the positioning data given by the other GPS receiver 13 or the autonomous navigation computing device 14 so as to accurately obtain the present position and the azimuth, an accurate distance information from the traveling path corresponding to the respective traveling position on the traveling path to the roadside zone is required. The terrain intelligence GI corresponds to a roadside zone information for obtaining the accurate distance information As the terrain information GI, there can be considered the following various data setting methods in which respectively constituted data contents are different in correspondence to conditions such as the width of the traveling path, the terrain intelligence showing with or without the bank in the side of the path and a continuity, the traveling direction distance of the traveling area having a bad midair viewing property and requiring the sensor fusion in the roadside zone distance, and the like.

Figure 2:
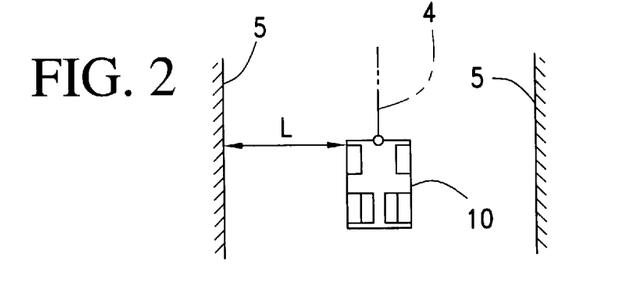
FIG. 2 is a schematic view of a traveling road having an even road width.

Setting method of terrain intelligence GI (1) In case that traveling road width is uniform and maintenance and repair of bank in traveling road side is completely executed As shown in FIG. 2, since the distance between the traveling road 4 (a substantially center line of the road width) and the roadside zone 5 is fixed, a reference value L0 of a distance L between the unmanned vehicle 10 and the roadside zone 5 is previously set. The present position is estimated on the basis of the difference value between the reference distance L0 and the measured value by the roadside zone distance measuring device 15.

(2) In case that traveling road width is non-uniform, maintenance and repair of bank is completely executed however distance between traveling path and bank is non-uniform (in case that it does not establish in fixed reference distance L0)

Figure 3:
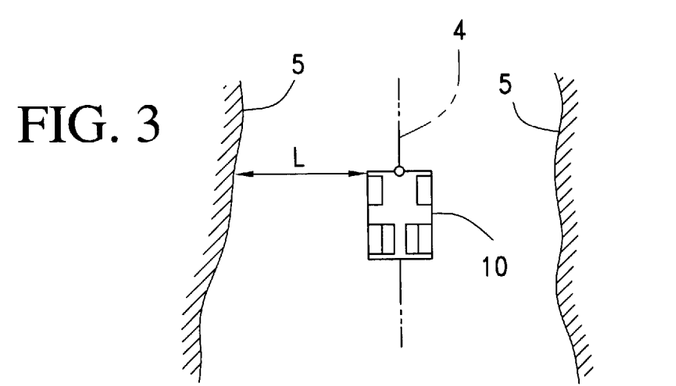
FIG. 3 is a schematic view of a traveling road in the case that a distance between the traveling road and a roadside zone is uneven.

As shown in FIG. 3, since the distance between the traveling path 4 and the roadside zone 5 changes in correspondence to the traveling path 4, it is necessary to sequentially compute the reference distance L0 in accordance with the traveling path 4 Further, in this case, an incline of the bank with respect to the traveling path 4 (a change rate of the roadside zone distance) is stored as the terrain intelligence GI.

The terrain intelligence GI has, for example, the following some setting methods.

2-1) Method of storing coordinate data of bank precisely measured in side of unmanned vehicle 10 in correspondence to traveling path 4

The reference distance L0 is sequentially determined on the basis of the distance between the stored bank coordinate and the traveling path 4, and the present position is estimated on the basis of the difference value between the determined reference distance L0 and the actually measured distance data L. Further, the incline of the bank with respect to the traveling path 4 (the change rate of the roadside zone distance) is calculated on the basis of the distance between the bank coordinate and the traveling path 4 In this case, it is possible to detect whether or not the coordinates overlap with each other and are too close to each other, the abnormality such as the divergence (contradiction) of the coordinate data or the like exists.

2-2) Method of previously computing distance between precisely measured bank coordinate data and traveling path 4 in vehicle control system side existing in base station, whereby unmanned vehicle 10 receives from vehicle control system side in correspondence to traveling path 4

This method has an advantage that a computing processing time in the side of the unmanned vehicle 10 becomes fast.

2-3) Method of measuring distance L to bank in correspondence to traveling path 4 at a time of teaching traveling path 4, storing both of teaching data of traveling path 4 and measured roadside zone distance L in vehicle control system side, and receiving roadside zone distance L in correspondence to traveling path 4 at a time of automatically traveling.

(3) In case that area having no maintained and repaired bank continues

A predetermined reflecting subject such as a reflecting pole, an advertising display or the like is placed in a side of the traveling path at a fixed interval, and a reflecting subject placing position coordinate, a distance between the reflecting subject and the traveling path 4 or the like is stored as the terrain intelligence GI. At a time of automatically traveling, the reference distance L0 between the unmanned vehicle 10 and the roadside zone 5 (the reflecting subject) is calculated on the basis of the stored reflecting subject placing coordinate and the coordinate of the traveling path 4, or the reference distance L0 is calculated on the basis of the stored reflecting subject and the traveling path 4, whereby the present position of the unmanned vehicle 10 is estimated on the basis of the reference distance L0. In this case, the reflecting subject placing coordinate may be determined by measurement, or may be stored by detecting the reflecting subject position at the same time of teaching traveling. Further, the distance between the reflecting subject and the traveling path 4 may be calculated on the basis of the measured result in the same manner, or may be stored by detecting at the same time of teaching.

(4) In case that position compensation in vehicle traveling direction is required even when maintained and repaired bank exists In this case, the reflecting subject is placed at a fixed interval, or the reflecting subject is placed at a point in which the traveling direction position compensation is required The coordinates of these reflecting subjects are previously measured accurately and stored as the terrain intelligence GI.

Next, a desertion will be given in detail of the sensor fusion function of the position measuring portion 11.

Sensor Fusion between GPS and Autonomous Navigation

Figure 4:
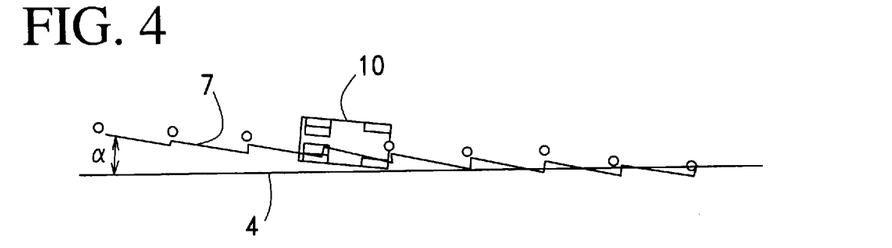
FIG. 4 is a schematic view of a sensor fusion between a GPS and an autonomous navigation.
Figure 5:
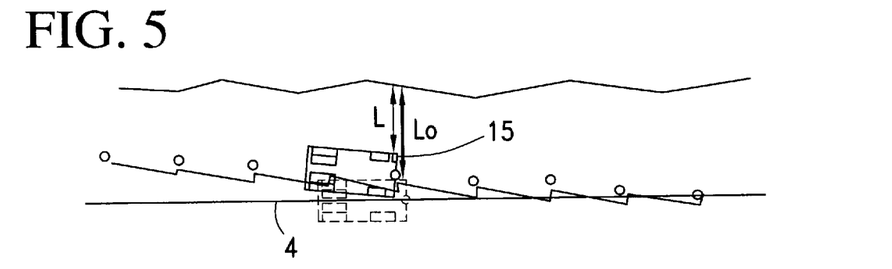
FIG. 5 is a schematic view of a method of detecting an abnormality of a positioning data on the basis of a roadside zone distance measured value.

In the case that both of the GPS receiver 13 and the autonomous navigation computing device 14 have no failure, and the respective positioning data have no abnormality, the present position and the present azimuth are calculated on the basis of the sensor fusion between the both positioning data. That is, as shown in FIG. 4, during the traveling, the positioning data (the position and the azimuth) in accordance with the GPS are determined with reference to the GPS absolute coordinate and azimuth positioned by the GPS receiver 13 at every predetermined time and the correction data from the fixed base station 1 at this time, a measuring accuracy of the positioning data in accordance with the GPS is compared with a measuring accuracy of the positioning data in accordance with the autonomous navigation, an average value is determined by multiplying by a weight (for example, 0.8 and 0.2) corresponding to the accuracy (reliability) of the respective positioning data, this is set to the compensated present position, and the azimuth is compensated on the basis of an amount of compensation of this present position Here, in the case that the measuring accuracy of the azimuth data in accordance with the autonomous navigation is high, the sensor fusion may be executed by using only the positional data among the positioning data in accordance with the GPS. The travel controlling portion determines an amount of steering in a direction respectively making a deviation (distance) α between the compensated present position and the target position on the traveling path 4, and a deviation between an angle of actual attitude of the vehicle (that is, the traveling direction) and an angle of target attitude of the traveling path 4 small travels the unmanned vehicle 10, and estimates and computes the present position and the azimuth from the relative position with reference to the compensated present position and azimuth in accordance with the dead reckoning navigation in the autonomous navigation computing device 14 during this time. The sensor fusion between the GPS navigation and the autonomous navigation mentioned above is repeated Abnormality Detection of Sensor Fusion between GPS and Autonomous Navigation In the case that the GPS receiver 13 and the autonomous navigation computing device 14 are normal, however, the abnormality (divergence) is found between the positioning data, the present position and the present azimuth are estimated on the basis of the sensor fusion between the respective positioning data of the GPS receiver 13, the autonomous navigation computing device 14 and the roadside zone distance measuring device 15. That is, the present position having higher reliability is determined by compensating the present position determined on the basis of the sensor fusion between the respective positioning data of the GPS and the autonomous navigation, in accordance with the sensor fusion with respect to the positional data given by the roadside zone distance, and the azimuth having higher reliability is determined by compensating the azimuth in accordance with the GPS navigation and the autonomous navigation on the basis of the amount of compensation of the present position In this case, as the method of detecting the data abnormality mentioned above, for example, as shown in FIG. 5, the abnormality can be judged when the difference value between the actually measured value of the roadside zone distance L measured by the normal roadside zone distance measuring device 15 and the reference distance L0 set or determined by the terrain intelligence GI becomes over a predetermined value (that is, becomes significantly too small or too large). Alternatively, it is possible to presume the abnormality due to an existence of the large divergence between the data, when the difference value between the respective positioning data in accordance with the different positioning methods becomes equal to or more than the predetermined value. In this case, a stability of the data of the reference distance L0 and the roadside zone actually measured distance is judged, the continuity thereof is securely recognized, and the bank shape is stably detected, that is, the judgement of the abnormality detection mentioned above is executed only in the case that the continuity exists. Further, as a matter of course, when the failure of the roadside zone distance measuring device 15 is generated, the abnormality diagnosis on the basis of the magnitude of the difference value between the roadside zone actually measured distance mentioned above and the reference distance L0, and the sensor fusion on the basis of the roadside zone distance are not executed.

Figure 6:
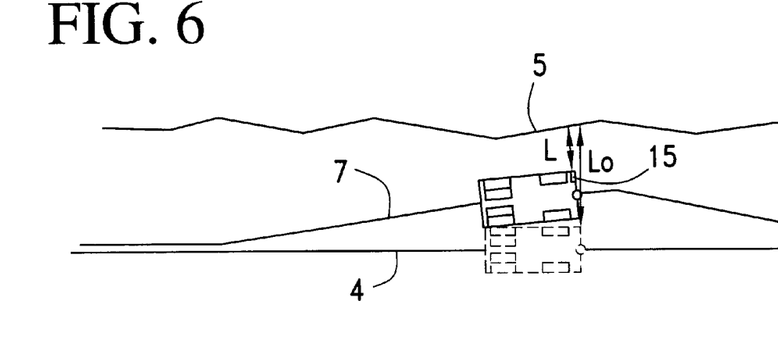
FIG. 6 is a schematic view of a sensor fusion between the roadside zone measurement and the autonomous navigation.

Sensor Fusion between Roadside Zone Measurement and Autonomous Navigation at a Time when GPS is Abnormal In the case that the abnormality is recognized the basis of the failure diagnosis of the GPS receiver 13, the vehicle travels in accordance with the autonomous navigation, however, since the estimated present position and azimuth gradually generate displacement due to an influence of the accumulated error of the gyroscope 21 and the speed sensor 22, and the traveling is controlled on the basis of the displaced position and azimuth information, the actual traveling track 7 gradually deviates from the target traveling path 4 at the displaced amount as shown in FIG. 6. At this time, the present position is estimated on the basis of the difference value between the actually measured value of the roadside zone distance L given by the roadside zone distance measuring device 15 and the reference distance L0, the present position having higher reliability is determined by compensating the position in accordance with the sensor fusion between the estimated present position on the basis of the roadside zone distance L and the estimated present position on the basis of the autonomous navigation, and the azimuth is compensated on the basis of the amount of compensation of the present position In the case that the roadside zone 5 corresponds to the subject such as the bank or the wall, on a general substantially straight or gently curved traveling path, the position compensation only in a lateral direction with respect to the traveling direction is executed on the basis of the present position determined in the manner mentioned above. It is because in such a case, the positional error in the traveling direction is small in comparison with that in the lateral direction and the error in the lateral Doreen is more important with respect to the automatic traveling, on the contrary, the error in the traveling direction in most cases has no problem.

In this case, when the measured roadside zone distance L is too small in comparison with the predetermined value or too large, it is judged that the vehicle significantly deviates from the traveling path 4 and the emergency stop is executed before executing the compensation mentioned above.

Figure 7:
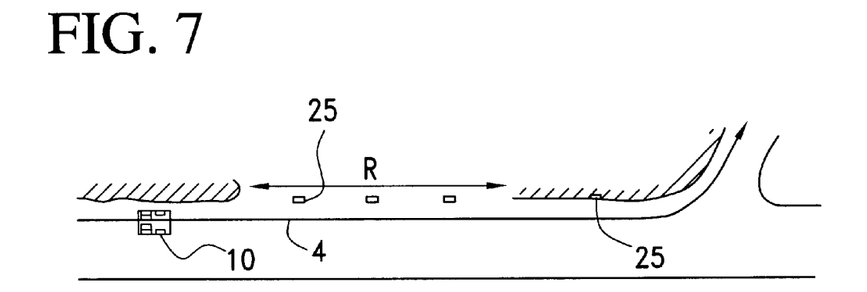
FIG. 7 is a schematic view of a traveling road in the case of placing a reflecting plate.

In Case That No Bank Exists or Error in Traveling Direction Has Problem a) In case that area R having no bank (refer to FIG. 7) continues for long distance b) In case of turning at crossing point or in case of taking a short turn c) In case that positional accuracy in traveling direction is required near stopping position such as hopper, earth removal place, earth loading place and like In these cases, as shown in FIG. 7, the reflecting plate 25 such as the reflecting pole, the advertising display and the like for compensating the position in the traveling direction, the placed coordinate of which is previously measured accurately is placed as the roadside zone 5. It is possible to accurately compensate the position in the traveling direction as well as in the lateral direction by measuring the distance to the reflecting plate 25 having the known coordinate by the roadside zone distance measuring device 15 and accurately estimating the present position on the basis of the measured distance. In this case, in order to determine the present position from the measured value by the roadside zone distance measuring device 15, it is possible to determine on the basis of the known coordinate of the reflecting plate 25, the vehicle traveling direction at a time of measuring and an oscillating direction of a laser or an ultrasonic output from the roadside zone distance measuring device 15 with respect to the traveling direction. Accordingly, if the positioning in accordance with the GPS can not be executed or becomes abnormal in such a place, or if the abnormality is recorded in the autonomous navigation, it is possible to increase the positional accuracy in the traveling direction on the basis of the sensor fusion between the positioning data of the present position in accordance with the roadside zone distance measuring device 15 and the positioning data of the present position in accordance with any one of the positioning given by the GPS and the positioning given by the autonomous navigation computing device 14, whereby it is possible to measure the position having a high reliability. As a result, it is possible to securely steer along the traveling path 4, it is possible to securely turn at the crossing point and the short turning point, and it is possible to improve the stopping accuracy at the stopping position.

Sensor Fusion Between Roadside Zone Measurement at Time that Autonomous Navigation is Abnormal and Positioning by GPS In the case that the abnormality of the autonomous navigation computing device 14 due to the failure of the gyroscope 21 and the speed sensor 22 is recognized, the structure is made such as to be switched to measuring means respectively constituting redundant systems as mentioned below in correspondence to aspects of the abnormality.

a) In case that all of attached speed sensors are abnormal

A GPS speed is used in place of the speed sensor 22. The GPS speed data is output from the GPS receiver 13 at every predetermined time (for example, 0.5 second).

b) In case that abnormality with respect to gyroscope exists

In place of the gyroscope 21, an angle of GPS attitude is used. The angle of GPS attitude corresponds to an estimated value of an attitude angle output from the GPS receiver 13 or an attitude angle (in the moving direction in this case) generated by the position moving track of the GPS antenna 12a.

Figure 8:
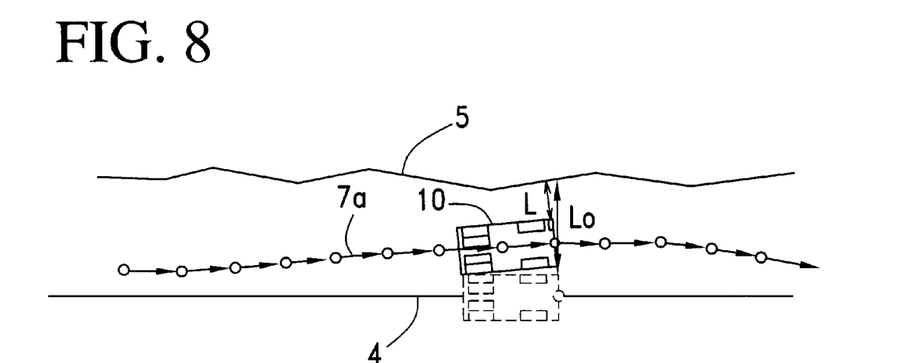
FIG. 8 is a schematic view of a sensor fusion between the roadside zone measurement and the positioning on the basis of the GPS.

Since the GPS speed mentioned above is calculated on the basis of the moving distance at every predetermined time, there is a case that an accuracy at a low speed is low, and since a data output time interval does not become smaller than a sampling time of the GPS, there is a case the measuring accuracy becomes deteriorated in comparison with the measuring accuracy of the speed in accordance with the autonomous navigation Further, since the angle of GPS attitude mentioned above is calculated on the basis of the change of the GPS antenna position, it has a certain degree of high accuracy at a time when the vehicle travels straight, however, since it does not coincide with the angle of vehicle attitude (that is, the traveling direction) at a time of turning or the like, there is a disadvantage that the accuracy is deteriorated. Accordingly, since the position measuring accuracy in accordance with the GPS speed and the angle of GPS attitude becomes lower than that of the autonomous navigation, a track 7a is going to displace as shown in FIG. 8, due to a guiding and traveling in accordance with a pseudo autonomous navigation using the GPS data. At this time, the measuring accuracy in accordance with the pseudo autonomous navigation is estimated on the basis of the amount of displacement between the present position computed on the basis of the distance actually measured value L to the roadside zone 5 (including the bank, the reflecting plate 25 mentioned above and the like) given by the roadside zone distance measuring device 15, and the present position measured on the basis of the GPS speed and/or the angle of GPS attitude, whereby the present position in accordance with the GPS speed and/or the angle of GPS attitude is compensated on the basis of the estimated measured accuracy. Further, the present position having higher reliability is determined in accordance with the sensor fusion between the compensated present position and the present position on the basis of the GPS positioning, and the azimuth is compensated on the basis of the amount of compensation of the present position In this case, before executing the compensation mentioned above, since the unmanned vehicle 10 deviate from the target traveling path 4 when the difference between the actually measured value of the roadside zone distance and the reference distance L0 becomes extremely too large, the structure is made such as to urgently stop the unmanned vehicle 10.

With Respect to Judgment of Bank Stability

An important matter in the case of executing the sensor fusion and the abnormality detection on the basis of the roadside zone distance measurement as mentioned above is at first that in the case that the subject to be measured is the bank and the wall, the structure is established on the assumption that a stability such as an evenness (a smoothly changing property), a continuity (uninterrupted state) and the like is estimated, and the positioning data in accordance with the roadside zone distance measurement is used at every time when the estimated result is good (at a time when it is judged to be stable). That is, it is judged that some abnormality is generated in the area having the unstable roadside zone 5 such as the area in which the bank or the wall is previously placed and discontinuous portion is provided, or the area which is changed more largely than the preset change rate, and the roadside zone distance measured in the area having the abnormality is deemed to be the abnormal data. Secondly, in the case of the reflecting pole, a reflection intensity of the reflecting pole is equal to or more than a predetermined value, and in the case of the advertising display (a sign advertising display having a predetermined shape and the like), a placing position and a placing distance are characterized, whereby it is important to make it possible to detect the feature of the reflecting plates 25 and dearly identify from the other subjects.

The judgment of the stability of the bank or the like is estimated on the basis of a parameter, for example, an amount of change of the roadside band distance from the preceding measured value (the difference value), a rate of change, a relative direction of the bank with respect to the vehicle which is calculated from the measuring distances at a plurality of positions (that is, an incline of the bank) or the like. At this time, when the calculated parameter has a magnitude equal to or more than a predetermined allowable value (for example, an allowable value is previously set with respect to the roadside zone distance change rate determined on the basis of the terrain intelligence GI), it is judged that the change of the bank or the like is sudden and unstable, and the structure is made such that the measuring data in accordance with the roadside zone distance measurement is not used. Further, the stability judging and estimating result is a judgment material for calculating the accuracy estimating value of the roadside zone distance measurement, whereby it is possible to reflect to the weighting at a time of executing the sensor fusion.

In this case, without limiting to the method mentioned above, it goes without saying that the structure may be made such as to previously measure a stable area and an unstable area or an area having no bank so as to store them in a side of a vehicle control system existing in the fixed base station 1 as the terrain intelligence GI, and the unmanned vehicle 10 inputs the terrain intelligence GI firm the side of the vehicle control system on the basis of the communication.

Figure 9:
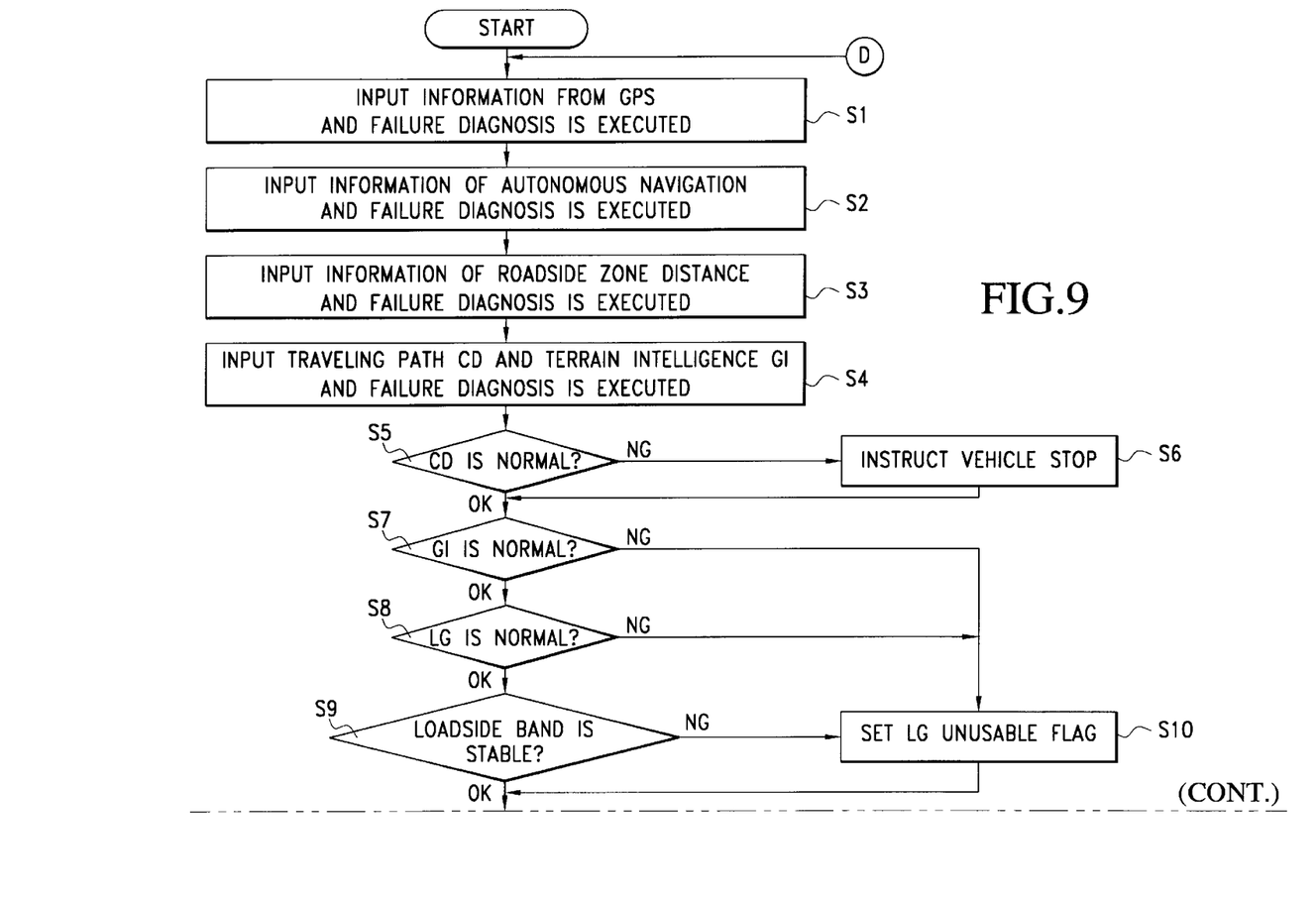
FIG. 9 is a flow chart (a front half) showing a processing procedure of the sensor fusion.
Figure 10:
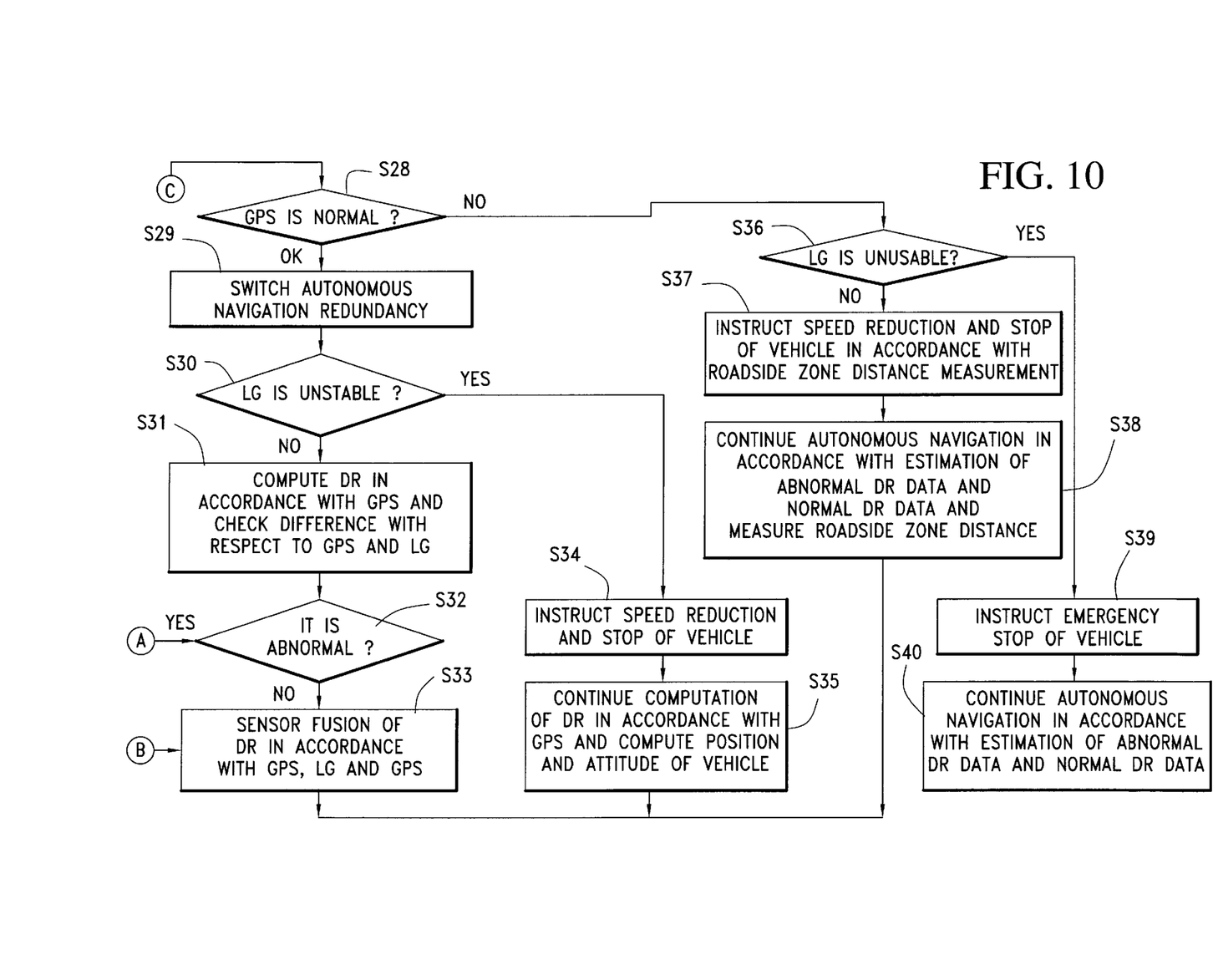
FIG. 10 is a flow chart (a rear half) showing the processing procedure of the sensor fusion.

A description will be given of a processing procedure of the sensor fusion of the position measuring portion 11 described above with reference to a flow chart shown in FIGS. 9 and 10.

At first, in a step S1, the information relating to the GPS navigation is input from the GPS receiver 13 and the failure diagnosis is executed. Next, in a step S2, the information of the autonomous navigation is input from the autonomous navigation computing device 14 and the failure diagnosis is executed Next, in a step S3, the information relating to the roadside zone distance measurement is input from the roadside zone distance measuring device 15, whereby the failure diagnosis is executed Further, in a step S4, the traveling path data CD and the terrain intelligence GI are input from the vehicle control system in the fixed base station 1 in accordance with the communication, whereby the failure diagnosis is executed.

Further, in a step S5, it is checked whether or not the traveling path data CD is normal, that is, whether or not the communication of the traveling path data CD is normal and the received data is continuous, and when it is normal, it is checked in a step S7 whether or not the terrain intelligence GI is normal, that is, whether or not the communication of the terrain intelligence GI is normal and the received data is normal (for example, whether or not the changing amount of the coordinate value of the bank and the changing rate are within the predetermined values, and the like). When the terrain intelligence GI is normal, it is checked in a step S8 whether or not it is normal in the failure diagnosis relating to the roadside zone distance measurement, and when it is normal, it is judged in a step S9 whether or not the stability of the roadside zone 5 determined on the basis of the roadside zone distance measuring data is good. When it is not normal in the steps S7 and S8 mentioned above, and when the stability is not good in the step S9, a roadside zone measurement impossibility flag is set in a step S10, and the step goes to a step S11. In this case, when the traveling path data CD is not normal in the step S5, a vehicle stop command is output to the travel controlling portion 17 in the step S6 and the vehicle is stopped.

When the stability is good in the step S9, it is judged in a step S11 whether or not the failure diagnosis result in accordance with the autonomous navigation is normal, and when it is normal, it is checked in a step S12 whether or not the failure diagnosis result in accordance with the GPS navigation is normal, and further when it is normal, it is checked in a step S13 whether or not the roadside zone measurement impossible flag is set. Thereafter, when the roadside zone measurement impossible flag is not set, the present positions are respectively computed in a step S14 in accordance with the autonomous navigation, the GPS navigation and the roadside zone distance measurement, the difference value between the respective present positions is determined, and next it is checked in a step S15 whether or not the respective difference values are within the predetermined values, and when they are within the predetermined values, it is judged in a step S16 that the divergence (the mutual contradiction) between the respective present position data does not exist, thereby executing the sensor fusion on the basis of the respective present position data and azimuth data determined in accordance with the autonomous navigation and the roadside zone distance measurement and computing the compensated present position and azimuth. Further, thereafter, the compensated present position and azimuth are determined as the final vehicle position and azimuth in a step S18, and the data are output to the control governing portion 16, the travel controlling portion 17 and the safety controlling portion 19. The control governing portion 16, the travel controlling portion 17 and the safety controlling portion 19 execute respective predetermined control government, travel control and safety travel control on the basis of the compensated present position and azimuth, the target position and the target traveling attitude. Thereafter, the step goes back to the step Si, and the processes are repeated.

When the respective difference values are not within the predetermined values in the step S15, it is judged in a step S17 that the divergence exists between the respective present position data, thereby outputting the vehicle stop command to the travel controlling portion 17 so as to stop the vehicle.

When the roadside zone measurement impossible flag is set in the step S13, the respective present positions and azimuths are computed in a step S19 in accordance with the autonomous navigation and the GPS navigation, the difference value between both of the present positions is determined, next it is checked in a step S20 whether or not the difference value is within the predetermined value, and when it is within the predetermined value, it is judged in a step S21 that the divergence between both of the present position data does not exist, thereby executing the sensor fusion on the basis of the respective present position and azimuth data determined in accordance with the GPS navigation and the autonomous navigation, computing the compensated present position and azimuth and thereafter going to the step S18. Further, when the difference value is not within the predetermined value in the step S20, the step goes to the step S17 so as to stop the vehicle.

When the failure diagnosis result in accordance with the GPS navigation is not normal in the step S12, it is checked in a step S22 whether or not the roadside zone measurement impossible flag is set, and when the roadside zone measurement impossible flag is not set, the respective present positions are computed in a step S23 in accordance with the autonomous navigation and the roadside zone distance measurement, and the difference value between both of the present positions is determined. Next, it is checked in a step S24 whether or not the difference value is within the predetermined value, and when it is within the predetermined value, it is judged in a step S25 that no divergence exists between both of the present position data, thereby executing the sensor fission on the basis of the respective present position and azimuth data determined in accordance with the autonomous navigation and the roadside zone distance measurement and computing the compensated present position and azimuth Thereafter, the step goes to the step S18. Further, when the difference value is not within the predetermined value in the step S24, the step goes to the step S17 so as to stop the vehicle.

When the roadside zone measurement impossible flag is set in the step S22, the present position and azimuth are estimated and computed in a step S26 in accordance with the autonomous navigation, and a command is output to the travel controlling portion 17 so as to reduce the speed of the vehicle and stop the vehicle on the basis of the estimated present position and azimuth in the step S27.

When the failure diagnosis result in accordance with the autonomous navigation is not normal in the step S11, it is checked in a step S28 whether or not the failure diagnosis result in accordance with the GPS navigation is normal When it is normal, a redundancy of the traveling speed and the traveling direction in accordance with the GPS navigation is switched in a step S29, that is, when it is diagnosed that all the input data relating to the traveling speed (in the case that a plurality of sensors exist) are abnormal or all the speed sensors are abnormal, the GPS speed is employed as the speed data, and when it is diagnosed that the input data relating to the traveling direction is abnormal or the azimuth sensor is abnormal, the GPS attitude is employed as the traveling direction data so as to execute the autonomous navigation.

Further, it is checked in a step S30 whether or not the roadside band measurement impossible flag is set, and when the roadside zone measurement impossible flag is not set, the present position is computed in accordance with the autonomous navigation on the basis of the measured data given by one having no failure among the speed sensor and the azimuth sensor, and the GPS speed and/or the GPS attitude in place of the failed one in a step S31, the present positions are respectively computed in accordance with the GPS navigation and the roadside zone distance measurement, and the difference value between the respective present positions is determined. Next, it is checked in a step S32 whether or not the respective difference values are within the predetermined values, and when they are within the predetermined values, the sensor fusion is executed on the basis of the respective present position data determined in accordance with the GPS navigation, the autonomous navigation (on the basis of the substitutive GPS speed and/or GPS attitude) and the roadside zone distance measurement in a step S33 so as to compute the compensated present position and azimuth, and the step goes to the step S18. When the respective difference values are not within the predetermined values in the step S32, the step goes to the step S17.

When the roadside zone measurement impossible flag is set in the step S30, the vehicle speed reduction stop command is output in a step S34 so as to start the speed reduction of the vehicle, and an alternate autonomous navigation in accordance with the substitutive GPS speed and/or GPS attitude is continued until the vehicle next stops in a step S35, and the step goes to the step 18 so as to execute the predetermined process.

When the failure diagnosis result in accordance with the GPS navigation is not normal in the step S28, it is checked in a step S36 whether or not the roadside zone measurement impossible flag is set; and when the roadside zone measurement impossible flag is not set, the vehicle speed reduction stop command is output in a step S37 so as to reduce the speed of the vehicle and stop the vehicle. Further, in the steering guide until the vehicle stops, the command is output so as to control the travel on the basis of the measured value of the roadside zone measurement and the terrain intelligence GI. Next, in a step S38, until the vehicle stops, a position compensation computation is executed in accordance with the autonomous navigation and the roadside zone distance measurement on the basis of the data having no abnormality among the traveling direction and the traveling direction of the autonomous navigation data, and the vehicle speed data and/or the vehicle direction data estimated from the vehicle speed and/or the vehicle attitude at the past normal time with respect to the data having the abnormality, the vehicle track, the present steering angle and the like. In the case that both of the traveling distance and the traveling direction in the autonomous navigation data are abnormal the position compensating calculation is executed in accordance with the autonomous navigation on the basis of the vehicle speed data and the vehicle direction data estimated from the vehicle speed and the vehicle attitude at the past normal time, the vehicle track the present steering angle and the like, and the roadside zone distance measurement.

When the roadside zone measurement impossible flag is set in the step S36, a quick brake is applied in a step S39 so as to urgently stop the vehicle. Next, in a step S40, until the vehicle stops, there is executed the autonomous navigation which is executed by estimating the data having no abnormality and the data having the abnormality among the traveling distance and the traveling direction m the autonomous navigation data from the vehicle speed and/or the vehicle attitude at the past normal time, the vehicle track, the present steering angle and the like. Further, in the case that both of the traveling distance and the traveling direction of the autonomous navigation data are abnormal there is executed the autonomous navigation on the basis of the estimation until the vehicle stops, from the vehicle speed and the vehicle attitude at the past normal time, the vehicle track, the present steering angle and the like, on both cases.

Figure 11:
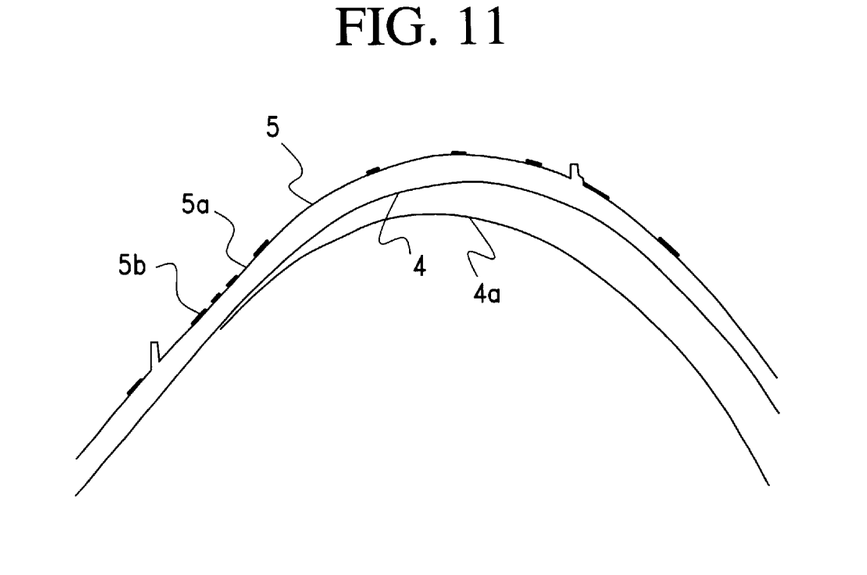
FIG. 11 is a view of a traveling track, which shows a result of an actual device test.

FIG. 11 is a view of a traveling track showing an actual machine test executed by using the travel controlling apparatus in accordance with the present invention In the drawing, reference 15a denotes a roadside zone 5 of an area in which the stability judging result is good at a time of traveling the vehicle along the traveling path 4 so as to measure the distance to the bank, and reference symbol 5b (shown by a thick line) denotes a roadside zone 5 of an area in which the stability judging result is not good In the case of traveling along the traveling path 4 provided with the roadside zone 5 mentioned above only in accordance with the autonomous navigation (on the assumption that the measurement in accordance with the GPS navigation is abnormal or impossible), there is shown that the vehicle is going to displace as shown in a track 4a. Further, at this time, in the case of computing the present position on the basis of the sensor fusion between the roadside zone distance measurement and the autonomous navigation so as to travel at a time when the roadside zone stability judging result is good, it is confirmed that the vehicle travels as illustrated without deviating from the traveling path 4 Accordingly, it is known that it is possible to increase the positioning accuracy of the vehicle position by the sensor fusion with respect to the roadside zone distance measurement.

As described above, in accordance with the present invention, there is obtained the following effect.

(1) Since the present position and azimuth are calculated by compensating at least any one of the position (and the azimuth as occasion demands) positioned in accordance with the GPS navigation and/or the position and the azimuth positioned in accordance with the autonomous navigation by the sensor fusion on the basis of the measured value of the distance to the roadside zone 5 constituted by the shoulder of the road, the advertising display, the reflecting plate 25 and the like, it is possible to restrict the reduction of the accuracy of position measurement due to the error of the GPS positioning or the error of the autonomous navigation positioning and it is possible to position the vehicle position at higher reliability.

(2) Further, in the case that the positioning on the basis of the GPS navigation becomes impossible, the accuracy of positioning is deteriorated, the positioning in accordance with the autonomous navigation becomes impossible or the abnormality of the positioning data in accordance with any one of both of the navigation is recognized, due to the deterioration of the communication environment such as an increase of a lag time of the compensated data and the like from the fixed base station 1, and the deterioration of the receiving environment such as the midair visibility, the arrangement of satellites, the multipass and the like, it is possible to calculate the present position and the azimuth having a reliability by the sensor fusion on the basis of the positioned data in accordance with the GPS navigation or the autonomous navigation in the normal side and the measured value of the roadside zone distance. Accordingly, even when the abnormality is generated, it is possible to securely control the guide traveling, and it is possible to increase the working ratio of the unmanned vehicle. As a result, it is possible to constitute the traveling system of the unmanned vehicle having a high reliability.

(3) The roadside zone distance measured in the area having the unstable roadside zone 5 is assumed as the abnormal data, and in the case that the stability of the roadside zone 5 is recognized, the data positioned in accordance with the roadside zone distance measurement is used. Since the compensation is applied to at least any one of the position (and the azimuth as occasion demands) positioned in accordance with the GPS navigation and/or the position and the azimuth in accordance with the autonomous navigation by the sensor fusion on the basis of the measured value of the roadside zone distance, it is possible to prevent the reduction of the accuracy of positioning which is generated by applying the compensation in the case that the roadside zone 5 is unstable. Further, since it is checked whether or not the divergence (the data abnormality) between the positioned data exists on the basis of the measured value of the roadside zone distance, in the case that the stability of the roadside zone 5 is Dozed, it is possible to judge without error. As a result, it is possible to continue the automatic traveling without being affected by the unstable condition of the roadside zone 5, and it is possible to increase the working ratio of the unmanned vehicle.

(4) Since the compensated position is computed in accordance with the sensor fusion in correspondence to the respective positioning accuracy of the GPS receiver 13, the autonomous navigation computing device 14 and the roadside zone distance measuring device 15, it is possible to determine the position and the azimuth at higher reliability. Accordingly, it is possible to securely control the guide traveling of the unmanned vehicle 10.

(5) Since the vehicle position and azimuth are positioned on the basis of the terrain intelligence GI and the roadside zone distance, for example, in the case that both of the positioning in accordance with the GPS navigation and the positioning in accordance with the autonomous navigation are temporarily impossible, or the abnormality is recognized in both of the positioned data, it is possible to execute the automatic guide traveling only on the basis of the roadside zone distance measurement by reducing the speed without immediately stopping. Accordingly, since it is possible to reduce a frequency of the guide stop of the unmanned vehicle so as to increase the working ratio, it is possible to construct the traveling system having a high reliability.

(6) The terrain intelligence GI stores the fixed roadside zone distance (the reference distance L0), or the coordinate position of the roadside zone 5 corresponding to the traveling path 4 or the roadside zone distance, m correspondence to the state of the roadside zone 5, whereby the present travel controlling apparatus can be applied even to the case of the traveling path 4 having various terrain condition, so that a general traveling system can be structured.

(7) In the area having no bank and the area in which the position in the traveling direction of the vehicle becomes important, for example, the short turn position, the position near the stop position and the like, it is possible to position at a high accuracy by placing the reflecting plate 25 as the roadside zone, and it is possible to improve the reliability.

What is claimed is:

1. A travel controlling apparatus of an unmanned vehicle comprising:
    a GPS receiver receiving a GPS signal so as to position an absolute coordinate position of a vehicle;
    an autonomous navigation computing device measuring a traveling direction and a traveling distance of the vehicle so as to position a relative coordinate position and azimuth of the vehicle from a specific position on the basis of the measured result;
    a position measuring portion calculating a present position and azimuth of the vehicle on the basis of the respective measured results of the GPS receiver and the autonomous navigation computing device; and
    a travel controlling portion relatively comparing a position and an azimuth of a previously set traveling path with the present position and azimuth calculated by the position measuring portion so as to control the vehicle travel in such a manner as to make respective deviation values small,
    wherein the travel controlling apparatus is provided with a roadside zone distance measuring device for measuring a distance from the vehicle to a roadside zone provided in a side of the traveling path, and said position measuring portion compensates at least one of a position positioned by said GPS receiver and/or a position and an azimuth positioned by the autonomous navigation computing device on the basis of the roadside zone distance measured by the roadside zone distance measuring device so as to determine the present position and azimuth.

2. A travel controlling apparatus of an unmanned vehicle as claimed in claim 1, wherein said position measuring portion judges a stability of the roadside zone from the measured value of the roadside zone distance, and compensates on the basis of said roadside zone distance at a time when the stability is normal.

3. A travel controlling apparatus of an unmanned vehicle as claimed in claim 2, wherein the compensation of said position measuring portion on the basis of the roadside zone distance is executed by a sensor fusion that includes weighting based on a positioning accuracy estimating value of the GPS receiver and/or a positioning accuracy estimating value of the autonomous computing device, and a positioning accuracy estimating value of the roadside zone distance measuring device.

4. A travel controlling apparatus of an unmanned vehicle comprising:
    a GPS receiver receiving a GPS signal so as to position an absolute coordinate position of a vehicle;
    an autonomous navigation computing device measuring a traveling direction and a traveling distance of the vehicle so as to position a relative coordinate position and azimuth of the vehicle from a specific position on the basis of the measured result;
    a position measuring portion calculating a present position and azimuth of the vehicle on the basis of the respective measured results of the GPS receiver and the autonomous navigation computing device; and
    a travel controlling portion relatively comparing a position and an azimuth of a previously set traveling path with the present position and azimuth calculated by the position measuring portion so as to control the vehicle travel in such a manner as to make respective deviation values small,
    wherein the travel controlling apparatus is provided with a roadside zone distance measuring device for measuring a distance from the vehicle to a roadside zone provided in a side of the traveling path, and said position measuring portion compensates at least one of a position positioned by said GPS receiver and/or a position and an azimuth positioned by the autonomous navigation computing device on the basis of the roadside zone distance measured by the roadside zone distance measuring device so as to determine the present position and azimuth, and
    wherein the compensation of said position measuring portion on the basis of the roadside zone distance is executed by a sensor fusion that includes weighting based on a positioning accuracy estimating value of the GPS receiver and/or a positioning accuracy estimating value of the autonomous computing device, and a positioning accuracy estimating value of the roadside zone distance measuring device.

* * * * *